United States Patent [19]
Kiebke

[11] Patent Number: 5,361,719
[45] Date of Patent: * Nov. 8, 1994

[54] BIODEGRADABLE HYDRATING CAT LITTER

[76] Inventor: Theodore M. Kiebke, Rt. 1 Box 276A, Detroit Lakes, Minn. 56501

[ * ] Notice: The portion of the term of this patent subsequent to Jun. 8, 2010 has been disclaimed.

[21] Appl. No.: 72,921

[22] Filed: Jun. 7, 1993

Related U.S. Application Data

[63] Continuation-in-part of Ser. No. 858,688, Mar. 27, 1992, Pat. No. 5,216,980.

[51] Int. Cl.⁵ ................................................ A01K 1/01
[52] U.S. Cl. ........................................................ 119/171
[58] Field of Search ........................ 119/171, 172, 173

[56] References Cited

U.S. PATENT DOCUMENTS

| | | | |
|---|---|---|---|
| 3,983,842 | 10/1976 | Marion et al. | 119/171 |
| 4,206,718 | 6/1980 | Brewer | 119/171 |
| 4,217,858 | 8/1980 | Dantoni | 119/171 |
| 4,341,180 | 7/1982 | Cortigene et al. | 119/172 |
| 4,519,340 | 5/1985 | Dicky | 119/171 |
| 4,571,389 | 2/1986 | Goodwin et al. | 119/171 |
| 4,883,021 | 11/1989 | Ducharme et al. | 119/171 |

FOREIGN PATENT DOCUMENTS 3021251 1/1991 Japan .................................. 119/171

Primary Examiner—John G. Weiss
Attorney, Agent, or Firm—Douglas L. Tschida

[57] ABSTRACT

A hydrating cat litter which solidifies upon contact with liquids to encapsulate pet waste matter. The litter comprises a mixture of a granulated, organic base material, which is susceptible to decomposition, a gluten containing material, such as ground wheat, and may include a fragrance carrier. In a preferred mixture, the base comprises a quantity of coarse ground agricultural grains, pulse crops or agricultural by-products or mixtures thereof, which support in suspension a quantity of semolina.

16 Claims, 2 Drawing Sheets

BIODEGRADABLE HYDRATING CAT LITTER

This is a continuation-in-part of co-pending application Ser. No. 07/858,688, filed Mar. 27, 1992 now U.S. Pat. No. 5,216,980.

BACKGROUND OF THE INVENTION

The present invention relates to cat litters and, in particular, to an improved scoopable litter.

Pet owners and particularly urban cat owners have numerous concerns pertaining to the care and maintenance of pets. An ever present problem is collecting and disposing of animal wastes. A secondary problem is masking any odor, pending disposal.

For cat owners, the predominate mechanism for collecting and disposing of the wastes is a so called "cat litter". Typically, the cat litter is contained within an appropriate container that is placed about the residence of the pet owner and where the cat overtime becomes accustomed to urinating or defecating. The liquids of the feces and urine are absorbed by the cat litter, which is periodically cleaned or discarded.

Commonly used cat litters may comprise a clay based particulate, sand or gravel mixture, sawdust or wood chips. Deodorants or masking scents can be added to the base particulate material to mask the odor, pending collection. Such deodorizers can be added directly to the particulate or impregnated into an absorbent carrier. Depending upon the aroma and, if the cat is being trained to use an odoriferous mixture, the cat may either accept or reject the litter. Rejection is indicated by undesired messes at other than preferred locations about the household.

Another litter is a so called "scoopable" litter which has been recently introduced to the pet owner market. Such litters typically are comprised of a clay based particulate and to which a deodorizer is added, along with a hydrophilic material. The hydrophilic material reacts with the water in the urine and fecal matter to coalesce and produce clumps of litter where the animal has urinated or defecated. These clumps can be scooped from the container and disposed of along with any solid feces. A difficulty encountered with currently available litters is that a relatively soft clump of waste matter is formed with the hydrophilic action.

With subsequent use of the container by the same or multiple cats, the cats can cause the clumps to break-up and remix with the litter, unless the pet owner regularly cleans the litter container. With any remixing of the fecal matter, the pet owner is faced with the same problems as with a non-scoopable litter. Should the cats have worms or other digestive tract parasites, the released parasites can be spread amongst the cats and even possibly to other pets.

Another difficulty is that cats tend to exhibit a preference for certain litters. Once trained to use one litter, a cat may reject another, even if offering improvements.

A further difficulty of clay based litters arises from disposal by pet owners into community sewer systems. That is, many pet owners flush the used litter or clumped fecal matter into their toilet. Because the clay is not susceptible to decomposition, the particles over time can collect and obstruct the system conduits. The problem is of special concern in large municipalities or metropolitan areas. Preferably, all of the litter ingredients should comprise materials which decompose in a relatively short time.

Accordingly, applicant has sought to develop a litter mixture which produces relatively hard clumps that encapsulate the waste and do not break up with continuing use by one or more cats. Desirably, the additive is also biodegradable and presents no undesired health problems to the cat.

The litter may include an attractant to minimize rejection of the litter by the cat. Moreover, the active ingredients of the mixture can be commercially sold as an additive mixture for use with commercially available non-scoopable litters. A non-scoopable litter upon mixing with the additive can thus be converted to a scoopable litter. As significant, any modified litter will be of a type familiar to the pet and not readily rejected.

SUMMARY OF THE INVENTION

It is accordingly a primary object of the present invention to provide a biodegradable cat litter mixture including a decomposable base material and a decomposable hydrophilic media, which produces a stable-clump upon exposure to urine and fecal matter to encapsulate same.

It is a further object of the invention to provide a cat litter including a biodegradable, hydrating media having a relatively high gluten concentration capable of encapsulating animal waste, particularly urine, into a permanently hard clump.

It is a further object to suspend the hydrating media in a liquid permeable, biodegradable base material or mixture, such as whole or coarse ground agricultural materials.

It is a further object of the invention to provide a hydrating media comprising a granular, wheat based additive.

It is a further object of the invention to provide a hydrating media comprising purified middlings of hard wheat, such as durum wheat and commonly known as semolina.

It is a still further object of the invention to provide a mixture including sodium bicarbonate and ground corn cob which is impregnated with a moisture released masking deodorizer.

It is a still further object of the invention to provide an attractant fragrance having "cat nip" qualities.

Various of the foregoing objects and advantages are achieved in a biodegradable cat litter mixture of the present invention. In a presently preferred form, the active clumping ingredient comprises quantities of semolina of a 20 to 80 mesh size. Quantities of sodium bicarbonate and ground corn cob, impregnated with a moisture released, masking and/or attractant fragrance may be added as desired. The fragrance is mixed with an oil derived from materials to which cats demonstrate an attraction, such as "catnip" type fragrances. The additive composition is biodegradable and digestible and not harmful to the animal's health.

The semolina is suspended in an organic, base material or mixture of base materials of an 8 to 80 mesh size, for example, whole or coarse ground grains, pulse crops or grasses (e.g. wheat, corn, barley, rice, sunflower, beans) or by-products of agricultural processes (e.g. corn cob, orange peels, peanut shells, hulls, husks, wood) or shredded and dried matter (e.g. paper). In combination, a biodegradable scoopable litter is obtained which is capable of decomposition upon disposal.

Still other objects, advantages and distinctions of the invention will become more apparent from the following description with respect to the appended drawings.

DESCRIPTION OF THE PREFERRED EMBODIMENT

Figure 1:
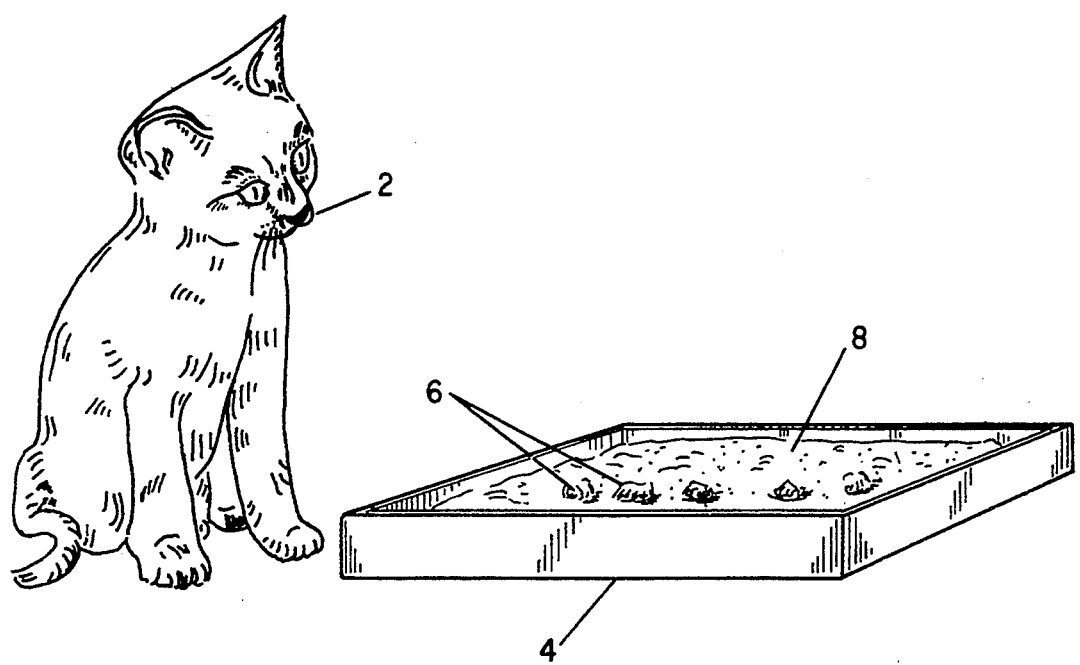
FIG. 1 is an isometric drawing showing a cat in relation to a typical container containing the inventive cat litter composition.

FIG. 1 depicts a cat 2 which is shown in relation to a typical container 4 for a cat litter 8. Such containers can be of any construction or shape so long as they are liquid impermeable. The container 4 is normally sized in a range of 14 to 20 inches by 20 to 32 inches and provides a sidewall height sufficient to accommodate a nominal and minimal litter depth of two to four inches. The volume of the container 8 is sized to contain a sufficient quantity of litter material to accommodate the normal cycle between cleanings. Additional sidewall clearance is desired to permit the cat to partially cover the waste matter by pawing adjacent litter 8 over the waste, without creating undue spillage onto the surrounding floor.

In the case of the present invention, the additional mechanical mixing by the pet facilitates the formation of hardened, encapsulated clumps of waste matter 6. These clumps are stable and readily removed with periodic cleaning and straining of the litter 8. The clumps 6 are preferably removed to a plastic bag or the like and disposed of with the household garbage.

Unfortunately, many urban or rural pet owners dispose of the encapsulated waste by flushing the material away in their toilets. Because most commercially available litters include a clay based particulate, the relatively heavy, liquid impermeable clay base particulate then typically collects as sediment in the pet owner's or community waste system. Over time, the sediment can create blockages or obstructions that can damage the pet owner's waste system or home in the event of a sewer backup.

In response, many municipalities have enacted ordinances banning such disposal. An acute need therefore exists for biodegradable litters. The litter of the present invention particularly satisfies this need with an organic mixture of agricultural based ingredients. U.S. Pat. No. 5,216,980 discloses predecessor litter mixtures of applicant which include a semolina active ingredient, a granulated clay base and fragrance containing particulates.

Figure 2:
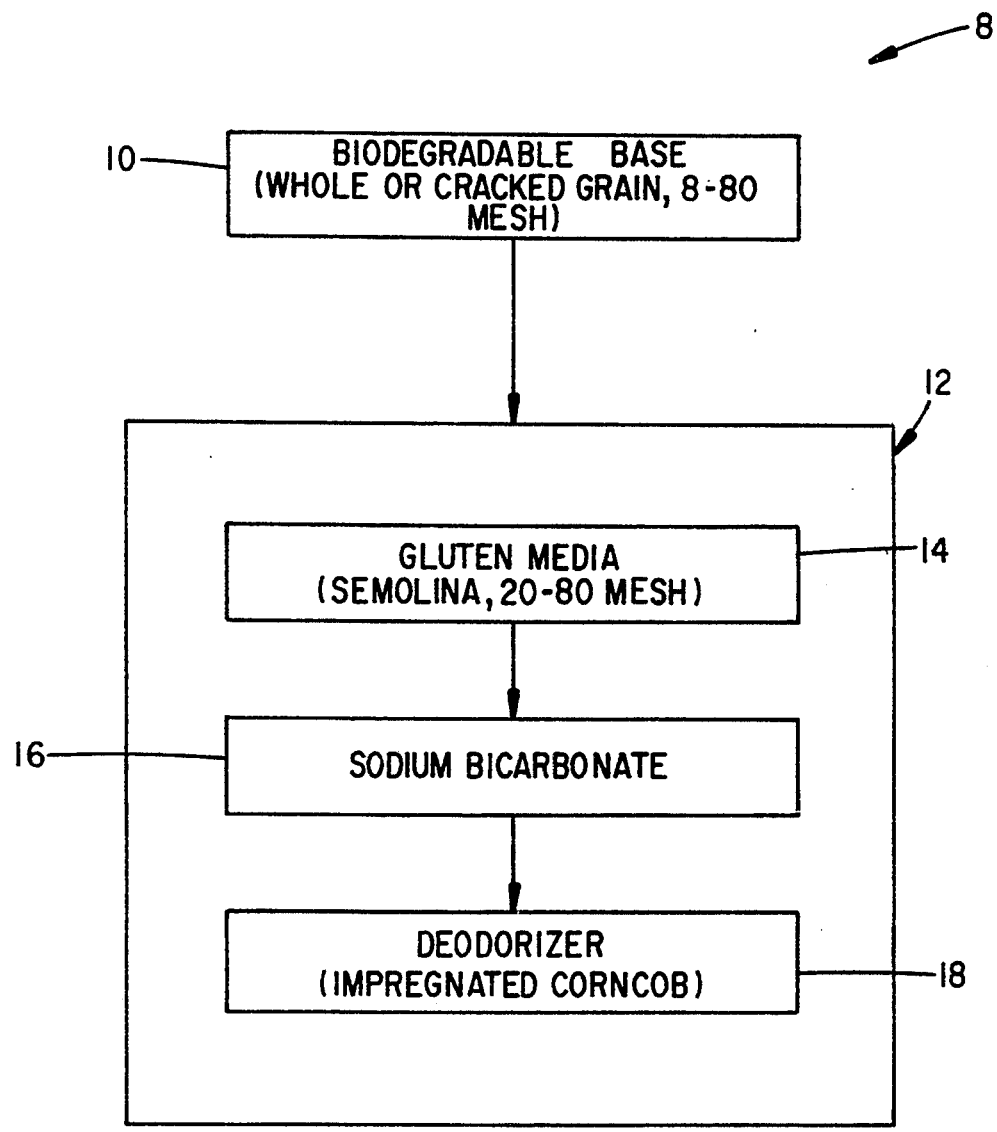
FIG. 2 shows a flow diagram for preparing the biodegradable cat litter of the invention.

With attention to FIG. 2, the base material 10 of the presently improved litter 8 preferably comprises a liquid permeable, biodegradable material, such as an organic material. The decomposition period of the material desirably should be relatively short. Economics also suggest that the material should be available in quantity at relatively low cost. Wood chips, shavings and saw dust have been used in the past with acceptable results. Presently considered materials, which are believed to offer advantages, are agricultural based materials, for example, whole or coarse ground grains, pulse crops or grasses (e.g. durum wheat, hard red spring wheat, corn, barley, rice, sunflower, flax, alfalfa and beans) and shredded or chopped and dried materials or by-products of processors of agricultural based materials (e.g. peanut shells, orange peelings, corn cob, alfalfa, flax and other grasses, husks and hulls, and recycled paper).

In a presently preferred litter mixture the base material 10 comprises whole or cracked durum wheat, red spring wheat or corn, which has been separated to a particulate size in the range of 8 to 80 mesh. The base material 10 may include conventional additives to prevent mold or kill bugs or the like which might normally occur in the base material. Alternatively, the pet owner may, as necessary, apply commercial flea and tick killers to the litter to remove any undesired contaminants.

Mixed with the base material is an additive or active hydrating composition 12. The additive 12 principally consists of a quantity of a gluten based media 14, along with sodium bicarbonate or baking soda 16 and a deodorizer 18 comprising impregnated ground or shredded corn cob pieces. The gluten based media 14 may, however, be used alone.

Preferably, the gluten based media 14 comprises a wheat derivative. Although flours of such grains provide desirable hydrophilic and adhesive or hydrating properties, they do not readily mix with the base material 10 and tend to settle to the bottom of the container 4. Grain flours can also contain bugs and become moldy over time, unless appropriate additives, as discussed above, are included or added to the mixture 8.

In appreciation of the foregoing deficiencies of ground flours, gluten based materials having a larger particulate size and granular consistency are desired. Preferred media 14 exhibit a consistency that permits ready mixing with the base material 10 and also provides an aesthetically pleasing coloration, such as middlings of hard wheat. Ideally, the gluten based media 14 should remain in suspension in the base material 10. For a base material 10 having a particulate size in the range of an 8 to 80 mesh, the gluten media 14 is processed to a size in a nominal range of a 20–80 mesh. The mesh rating is determined in relation to grain processor industry standard sizes.

A preferred gluten containing media 14 is a hard wheat, such as durum wheat, which is commonly used to make pasta, and which is sold under the common name of semolina. Semolina is more grainy than various wheat flours and at the above mesh sizes tends to remain in suspension in the base particulate 10.

By maintaining a homogeneous suspension of the gluten based media 14 within the base particulate 10, a faster acting hydration or coalescence is achieved with the animal waste matter. This action also prevents the liquid from seeping through to the bottom of the container 4, where clumping and/or hardening to the container bottom can create difficulties during periodic cleanings of the litter.

Appreciating the desire to maintain the suspension of the gluten based media 14 and the foregoing relative particle sizes, tests have shown relative concentration ratios in the range of 1 to 6 parts of base particulate 10 to semolina 14 provide acceptable results. A 1:2 ratio or intermediate ratios provide faster clumping actions, but at greater cost.

A quantity of sodium bicarbonate or baking soda 16 may be added to the active composition 12 to facilitate the clumping action and to neutralize odors from the waste matter. A relative mixture range of this material to semolina 14 might comprise 1–5% bicarbonate to semolina. Settling of the bicarbonate is partially prevented by the semolina, which fills voids between the particles of base material 10.

To further neutralize any waste matter odors and provide a masking scent, the active composition 12 may include a quantity of impregnated ground corn cob pieces 18. If used, the corn cob particulate is impregnated with a biodegradable and digestible deodorizer or neutralizer. In particular, the corn cob pieces are soaked in a liquid material sold under the trade name NILOSORB which includes a desired fragrance oil. The NILOSORB is a water activated material which upon exposure to waste liquids releases the bound fragrance to mask the waste odors.

The NILOSORB has an inherent fragrance which acts like a "cat nip" or attractant and to which test animals have shown a definite preference. It is believed that the cause of this attraction is an amyl acetate oil base of the NILOSORB. Still other oils derived from mint plants can be added to the basic deodorizer or neutralizer. The impregnated corn cob is mixed with the semolina 14 in a concentration range of 1-5% corn cob to semolina 14.

The attractant qualities of the NILOSORB deodorizer/neutralizer also reduces the likelihood of rejection. In test cases, cats have shown a defined preference to litters improved with the active composition 12.

The active gluten based composition 12 is preferably combined with the biodegradable base material 10 as discussed above. The composition 12, however, can be mixed with a clay particulate litter base or alternatively, the composition 12 can be added to other non-scoopable, commercially available cat litters to provide the desired clumping function. For those instances where a pet has become accustomed to one particular cat litter 8, such flexibility enables the pet owner to obtain the desired clumping, with a litter familiar to the cat and which is not likely to be rejected.

As regards the clumping action, the principal active ingredient is the gluten containing semolina 14. Within the relatively liquid impermeable environment of a clay base, the semolina 14 demonstrates a hydrophilic action to the liquid waste matter, which dominates over any absorption which occurs at any deodorant impregnated corn cob. The more porous corn cob, however, does advantageously retain the waste liquids closer to the surface of the litter 8 for a period of time which allows the liquids to react with the semolina 14.

The biodegradable, liquid permeable base material 10 of the presently preferred litter 8 similarly acts to retain the liquids close to the container surface. Although not as absorbant as wood or paper, the larger concentration of liquid permeable agricultural base materials, whether or not deodorant impregnated corn cob particulate is present, enhance the liquid retention property. Depending upon the concentration ratio of semolina 14 to the base particulate 10, most typically the litter mixture ingredients are selected and provided at concentrations which produce clumping within the first ½ to 1 inch layer of litter material. Depending upon the type of base material 10, the degree of liquid absorption will vary, with the base absorbing greater or lesser amounts of liquid. Over time, the retained liquid is leached away by the semolina 14, even if initially, partially absorbed by the base material 10. Although more of the base material 10 may be encapsulated into the clumps 6, the quantity of bagged litter 8 can be adjusted.

Depending also upon cost and availability of base material ingredient 10, one or more types of base ingredients may be used. The relative concentrations of such materials are adjusted to provide the desired moisture retention and encapsulation. Although numerous base material ingredients 10 have been suggested, it is to be appreciated many other materials can be substituted. The type of material can be selected to be the most cost effective in relation to the locale where the litter 8 is prepared.

Upon exposure to liquids, the presently improved litter 8 or commercial litters improved with the additive composition 12 produce rock-hard clumps 6. After approximately thirty minutes of exposure to liquid wastes, clumps are formed which can be broken only with great difficulty and especially not from subsequent use of the litter container 14 by the pet 2. Moreover, the clumps encapsulate the waste matter, such that any parasites contained within the waste matter are less likely to be integrated into the litter container 4 and distributed to other pets which may be using the same container 4.

The invention has been described with respect to a basic, preferred biodegradable cat litter mixture which includes a base material of organic agricultural materials and a gluten based additive composition including wheat middlings. The ingredients may be mixed to various concentrations and the basic litter may include other ingredients to facilitate pet use, useable life, storage life and clean-up. Various modifications and improvements thereto have also been suggested. It is to be appreciated, however, that still other equivalent compositions and mixtures may suggest themselves to those skilled in the art. Accordingly, it is contemplated the invention should be interpreted to include all those equivalent compositions within the spirit and scope of the following claims.

What is claimed is:

1. An animal litter composition comprising a non-hydrated admixture of selected quantities of:
   a) a base comprising a granular liquid permeable organic particulate; and
   b) a substantially starch free, gluten media, wherein the granularity of the gluten media is selected to provide a substantially homogeneous suspension of the gluten media within said base, and wherein said composition reacts in the presence of liquid containing animal waste to bind the animal waste into hardened, biodegradable clumps of animal waste, base and media.

2. A litter composition as set forth in claim 1 wherein said base comprises cracked wheat.

3. A litter composition as set forth in claim 1 wherein said gluten media comprises middlings of hard wheat.

4. A litter composition as set forth in claim 3 wherein said hard wheat comprises durum wheat.

5. A litter composition as set forth in claim 1 wherein said gluten media is sized in the range of a 20 to 80 mesh.

6. A litter composition as set forth in claim 1 wherein said base comprises an agricultural material selected from a class including whole grained or ground wheat, rice, barley, corn, beans, sunflower, oats, flax and alfalfa.

7. A litter composition as set forth in claim 6 wherein the class of base materials includes by-products of agricultural processing including hulls, husks, shells, peels, and cobs.

8. A litter composition as set forth in claim 1 wherein said base comprises a material selected from a class including paper and agricultural by-products, namely corn cob, peanut shells, orange peels, grasses, hulls, and husks.

9. A litter composition as set forth in claim 1 wherein a concentration ratio in the range of 1 to 6 parts of base to the gluten media is provided.

10. A litter composition as set forth in claim 1 including a deodorizer.

11. An animal litter composition comprising a non-hydrated admixture of selected quantities of:
   a) a base comprising ground hard wheat sized in the range of an 8 to 80 mesh; and
   b) durum wheat middlings sized in the range of a 20 to 80 mesh, wherein the wheat middlings are mixed with the base to a substantially homogeneous suspension, and wherein said composition reacts in the presence of liquid containing animal waste to bind the animal waste into hardened, biodegradable clumps of animal waste, base and media.

12. A litter composition as set forth in claim 11 wherein a concentration ratio in the range of 1 to 6 parts of base to wheat middlings is provided.

13. An animal litter composition comprising a non-hydrated admixture of selected quantities of:
   a) a base comprising an agricultural grain sized in the range of a 12 to 80 mesh;
   b) a substantially starch free wheat based media, wherein a concentration ratio in the range of 1 to 6 parts of base to wheat based media is provided, wherein the granularity of the wheat based media is selected to admix with said base and provide a substantially homogeneous suspension of the media within said base, and wherein said composition reacts in the presence of liquid containing animal waste to bind the animal waste into hardened, biodegradable clumps of animal waste, base and wheat based media.

14. A litter composition as set forth in claim 13 wherein said wheat based media comprises middlings of wheat sized in the range of a 20 to 80 mesh.

15. A litter composition as set forth in claim 13 wherein said base comprises cracked hard wheat.

16. A litter composition as set forth in claim 15 including sodium bicarbonate and a deodorizer.

* * * * *